(12) United States Patent
Cole et al.

(10) Patent No.: US 8,095,172 B1
(45) Date of Patent: Jan. 10, 2012

(54) CONNECTIVITY MANAGER TO MANAGE CONNECTIVITY SERVICES

(75) Inventors: Terry L. Cole, Austin, TX (US); Jose Tormo, Austin, TX (US)

(73) Assignee: GlobalFoundries Inc., Grand Cayman (KY)

( * ) Notice: Subject to any disclaimer, the term of this patent is extended or adjusted under 35 U.S.C. 154(b) by 1082 days.

(21) Appl. No.: 11/843,784

(22) Filed: Aug. 23, 2007

(51) Int. Cl.
*H04M 1/00* (2006.01)

(52) U.S. Cl. .................. 455/550.1; 455/435.2; 370/254; 370/386

(58) Field of Classification Search ................... 455/403, 455/428, 3, 410, 411, 414.1, 426.2, 435.2, 455/418–420; 370/252, 254, 328, 386
See application file for complete search history.

(56) References Cited

U.S. PATENT DOCUMENTS

| | | | |
|---|---|---|---|
| 7,039,027 B2 * | 5/2006 | Bridgelall | 370/329 |
| 7,430,602 B2 * | 9/2008 | Babbar et al. | 709/227 |
| 7,978,691 B1 * | 7/2011 | Cole | 370/386 |
| 2006/0084417 A1 * | 4/2006 | Melpignano et al. | 455/418 |
| 2006/0121914 A1 * | 6/2006 | Kim et al. | 455/456.1 |
| 2006/0282518 A1 * | 12/2006 | Karaoguz et al. | 709/221 |
| 2007/0073868 A1 | 3/2007 | Nelson | |
| 2007/0089161 A1 | 4/2007 | Waris | |
| 2008/0155159 A1 * | 6/2008 | Rivas et al. | 710/305 |
| 2008/0240091 A1 * | 10/2008 | Kesavan et al. | 370/389 |
| 2011/0082990 A1 * | 4/2011 | Cole et al. | 711/162 |

FOREIGN PATENT DOCUMENTS

| | | |
|---|---|---|
| EP | 1526682 A | 4/2005 |
| WO | WO2004013488 A | 4/2004 |
| WO | WO2006062354 A | 6/2006 |

OTHER PUBLICATIONS

International Search Report and Written Opinion for PCT Application No. PCT/US2008/008803, mailed Dec. 17, 2008.

* cited by examiner

*Primary Examiner* — Cong Tran
(74) *Attorney, Agent, or Firm* — Hamilton & Terrile, LLP; Gary W. Hamilton (57) ABSTRACT

A system and method are disclosed for managing the service connectivity of a mobile device to a plurality of connectivity services. A mobile device comprising a service connectivity manager accesses a repository of service connectivity management information. The service connectivity manager uses a first subset of the service connectivity management information to determine the connectivity services supported by a mobile device. A second subset of the service connectivity management information is then used by the service connectivity manager to determine the connectivity services supported by a predetermined network. The service connectivity manager then manages the service connectivity between the mobile device and the connectivity services supported by the predetermined network.

42 Claims, 7 Drawing Sheets

CONNECTIVITY MANAGER TO MANAGE CONNECTIVITY SERVICES

BACKGROUND OF THE INVENTION

1. Field of the Invention

Embodiments of the invention relate generally to information processing and communication systems. More specifically, embodiments of the invention provide a system and method for managing the service connectivity of a mobile device to a plurality of connectivity services.

2. Description of the Related Art

Advances in microprocessor design and manufacturing have led to the evolution of powerful computing platforms with small form factors, modest power consumption, and low heat dissipation. These platforms have been adopted for use in a wide variety of mobile devices that include cell phones, smartphones, personal digital assistants (PDAs), tablet PCs, and laptop computers. It is now becoming common for these devices to not only support multiple types of physical and wireless connectivity, but access a wide variety of connectivity services as well.

While a mobile device may be able to support a particular connectivity service, the service's protocol, bandwidth and quality of service (QoS) requirements may not be supported by the connectivity options that are available. For example, a user's mobile device may be configured to support physical connectivity such as a digital subscriber line (DSL) broadband connection in their home and an Ethernet local area network (LAN) in their office. In addition, the mobile device may also be configured to support access to wireless local area networks (WLANs) such as those based on variations of the IEEE 802.11 specification, often referred to as WiFi. To provide additional connectivity, the mobile device may also include a wireless modem that supports a wireless wide area network (WWAN) connection to a general packet radio service (GPRS) or enhanced data rates for GSM evolution (EDGE) data network when in the field. As configured, the mobile device may be able to receive Internet Protocol TV (IPTV) broadcasts through the DSL connection at the mobile user's home, but not over the Ethernet LAN connection at the office. Similarly, the mobile device may be able to receive streaming media using the DSL connection at the home, WLAN connections at retail venues (e.g., coffee shops, airports, etc.) and at the office, but not over the insufficient bandwidth of a GPRS WWAN connection. Likewise, all of these connectivity options may support general connection to the Internet, but a LAN or WLAN connection in a hotel or airport may not be able to support a secure virtual private network (VPN) connection.

In some cases, available network connectivity may be homogenous to the degree that the same communications protocol and bandwidth is available, such as for WiFi connections in the mobile device user's home, at a coffee shop, in an airport, or at their office. More often, network connectivity is likely to be heterogeneous, such as when a mobile device uses a DSL connection at home, a WWAN EDGE connection in the field, a WiFi connection in a retail venue, and an Ethernet LAN connection in their office. Further complications are caused by overlapping network coverage, as it may be difficult to determine which network connectivity option will deliver the QOS required for some connectivity services. Current approaches to these issues include network roaming solutions that detect the presence of wireless networks, discover the protocol they use, determine their area of coverage, and then transfer network connectivity according to predetermined parameters. In some approaches, these network connectivity transfers are automatic and transparent while others require varying degrees of user interaction. However, none of these are able to determine in advance whether a particular connectivity service is supported by a given network connectivity option. As a result, mobile device users are often required to connect, disconnect, and reconnect to different connectivity options as they traverse from one area of network coverage to another.

SUMMARY OF THE INVENTION

A system and method are disclosed for managing the service connectivity of a mobile device to a plurality of connectivity services. In various embodiments of the invention, a mobile device comprising a service connectivity manager accesses a repository of service connectivity management information. The repository of service connectivity management information comprises predetermined mobile device configuration information, network and connectivity service connectivity information, network connectivity policies, and mobile device user credentials. In one embodiment, the repository of service connectivity management information is stored within a mobile device. In another embodiment, the repository is stored on a network host and receives service connectivity management information from a plurality of sources. In another embodiment, the network host receives service connectivity management information collected by the service connectivity manager.

In different embodiments, the service connectivity manager uses a first predetermined subset of the service connectivity management information to determine the connectivity services supported by a mobile device. A second predetermined subset of the service connectivity management information is then used by the service connectivity manager to determine the connectivity services supported by a first network. The service connectivity manager then manages the service connectivity between the mobile device and the connectivity services supported by the first network.

In one embodiment, the service connectivity manager discovers the presence of a wireless network by detecting a wireless network signal and then autonomously transfers the connectivity of the mobile device from the first network to the second network. In another embodiment, subsets of the service connectivity management information are used by the service connectivity manager to autonomously transfer the connectivity of the mobile device from the first network to the second network. In various embodiments, transfer of connectivity from the first network to the second network is dependent upon each network's direct support of predetermined connectivity services. In other embodiments, transfer of connectivity to the second network is dependent upon the network's ability to provide indirect access to connectivity services or devices such as a storage area network (SAN). In one embodiment, a connectivity service application running on a mobile device is monitored to determine whether a second network provides the connectivity service required for its support. If it does, then network connectivity is transferred. In another embodiment, the first and second networks are monitored to determine whether they support a predetermined connectivity service. If they do, the mobile device is prompted to run a corresponding connectivity service application.

BRIEF DESCRIPTION OF THE DRAWINGS

The present invention may be better understood, and its numerous objects, features and advantages made apparent to FIG. 1 is a generalized block diagram illustrating an information processing system 100 as implemented in accordance with an embodiment of the invention.

DETAILED DESCRIPTION

A system and method are disclosed for managing the network connectivity of a mobile device to a plurality of connectivity services and devices. In various embodiments, a mobile device comprising a service connectivity manager accesses a repository of service connectivity management information. The repository of service connectivity management information comprises predetermined mobile device configuration information, network and service connectivity information, service connectivity policies, and mobile device user credentials.

Figure 1:
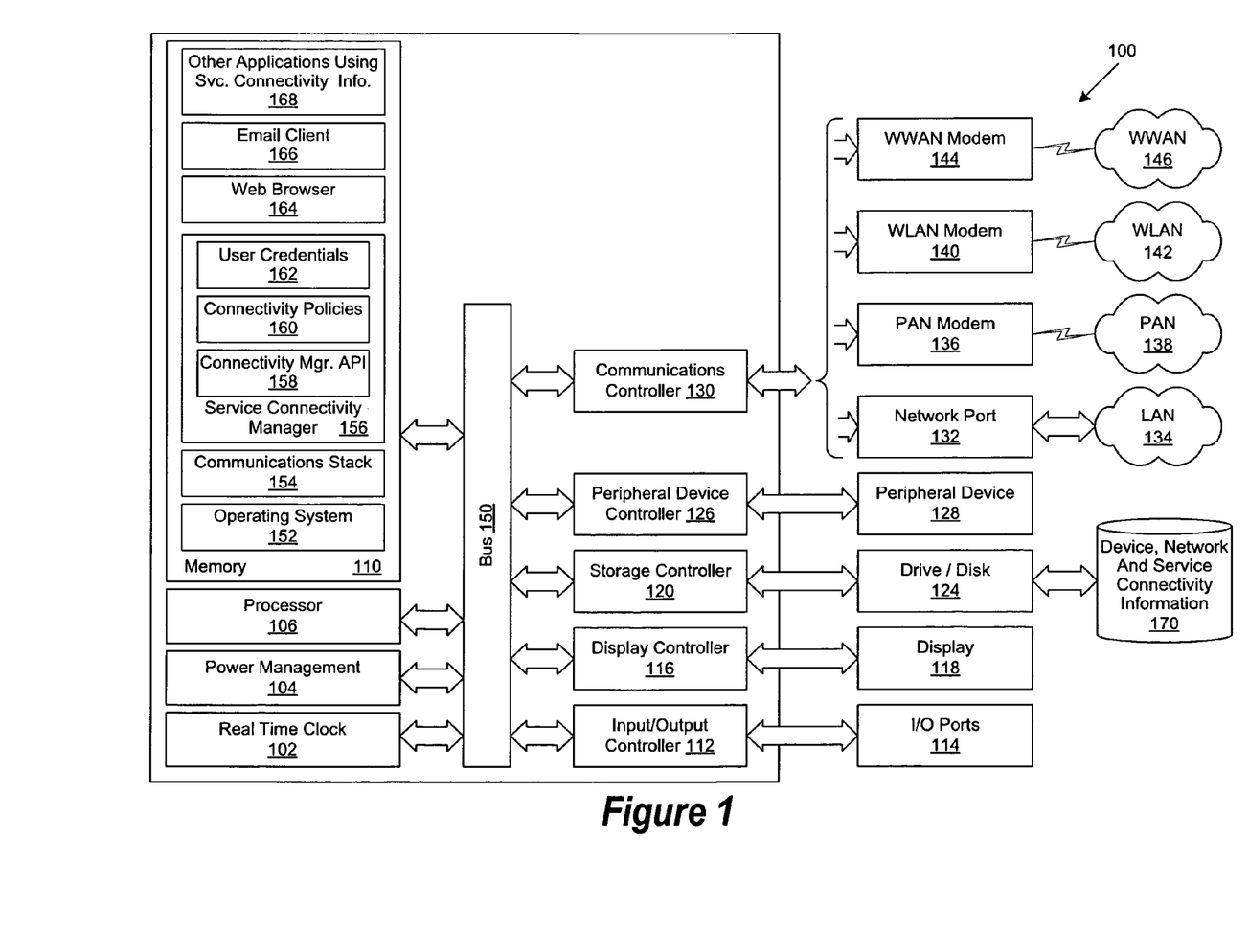

FIG. 1 is a generalized block diagram illustrating an information processing system 100 as implemented in accordance with an embodiment of the invention. System 100 comprises a real-time clock 102, a power management module 104, a processor 106 and memory 110, all physically coupled via bus 140. In different embodiments, memory 110 comprises operating system 152, communications stack 154, and service connectivity manager 156. Service connectivity manager 156 further comprises a service connectivity application program interface (API) 158, connectivity policies 160 and user credentials 162. Memory 110 also comprises Web browser 164, email client 166, and other applications using service connectivity information 168. In various embodiments, API 158 allows the service connectivity manager 156 to uniformly provide device, network and service connectivity information to the Web browser 164, email client 166, and other applications using service connectivity information 168. In different embodiments, applications using service connectivity information 168 include, but are not limited to, a digital television viewer, a premium digital content manager, printer services manager, and a location mapping application.

Also physically coupled to bus 140 is an input/out (I/O) controller 112, further coupled to a plurality of I/O ports 114. In different embodiments, I/O port 114 may comprise a keyboard port, a mouse port, a parallel communications port, an RS-232 serial communications port, a gaming port, a universal serial bus (USB) port, an IEEE1394 (Firewire) port, or any combination thereof. Display controller 116 is likewise physically coupled to bus 140 and further coupled to display 118. In one embodiment, display 118 is separately coupled, such as a stand-alone, flat panel video monitor. In another embodiment, display 118 is directly coupled, such as a laptop computer screen, a tablet PC screen, or the screen of a personal digital assistant (PDA). Likewise physically coupled to bus 140 is storage controller 120 which is further coupled to mass storage devices such as a tape drive or hard disk 124. In different embodiments of the invention, hard disk 124 further comprises device, network, and service connectivity information 170. Peripheral device controller is also physically coupled to bus 140 and further coupled to peripheral device 128, such as a random array of independent disk (RAID) array or a storage area network (SAN).

In one embodiment, communications controller 130 is physically coupled to bus 140 and is further coupled to network port 132. In turn, network port 132 further couples the information processing system 100 to one or more physical networks 134, such as a local area network (LAN) based on the Ethernet standard. In other embodiments, network port 132 may comprise a digital subscriber line (DSL) modem, cable modem, or other broadband communications system operable to connect the information processing system 100 to network 134. In these embodiments, network 134 may comprise the public switched telephone network (PSTN), the public Internet, a corporate intranet, a virtual private network (VPN), or any combination of telecommunication technologies and protocols operable to establish a network connection for the exchange of information.

In another embodiment, communications controller 130 is likewise physically coupled to bus 140 and is further coupled to wireless personal area network (PAN) modem 136. In turn, PAN modem 136 further couples the information processing system 100 to one or more wireless PAN networks 138. In one embodiment, wireless PAN network 138 is based on technologies such as Bluetooth or Ultra Wideband (UWB). In another embodiment, communications controller 130 is coupled to wireless local area network (WLAN) modem 140. In turn, WLAN modem 140 further couples the information processing system 100 to one or more WLANs 142, such as those based on variations of the IEEE 802.11 specification, often referred to as WiFi. In yet another embodiment, communications controller 130 is coupled to wireless wide area network (WWAN) modem 144. In turn, WWAN modem 144 further couples the information processing system 100 to one or more WWANs 146, such as those based on an industry standard including two and a half generation (2.5G) wireless technologies such as general packet radio service (GPRS) and enhanced data rates for GSM evolution (EDGE). In other embodiments, WWAN network 146 comprises WWANs based on existing third generation (3G) wireless technologies including universal mobile telecommunications system (UMTS) and wideband code division multiple access (W-CDMA). Other embodiments also comprise the implementation of other 3G technologies, including evolution-data optimized (EVDO), IEEE 802.16 (WiMAX), wireless broadband (WiBro), high-speed downlink packet access (HSDPA), high-speed uplink packet access (HSUPA), and emerging fourth generation (4G) wireless technologies.

Figure 2:
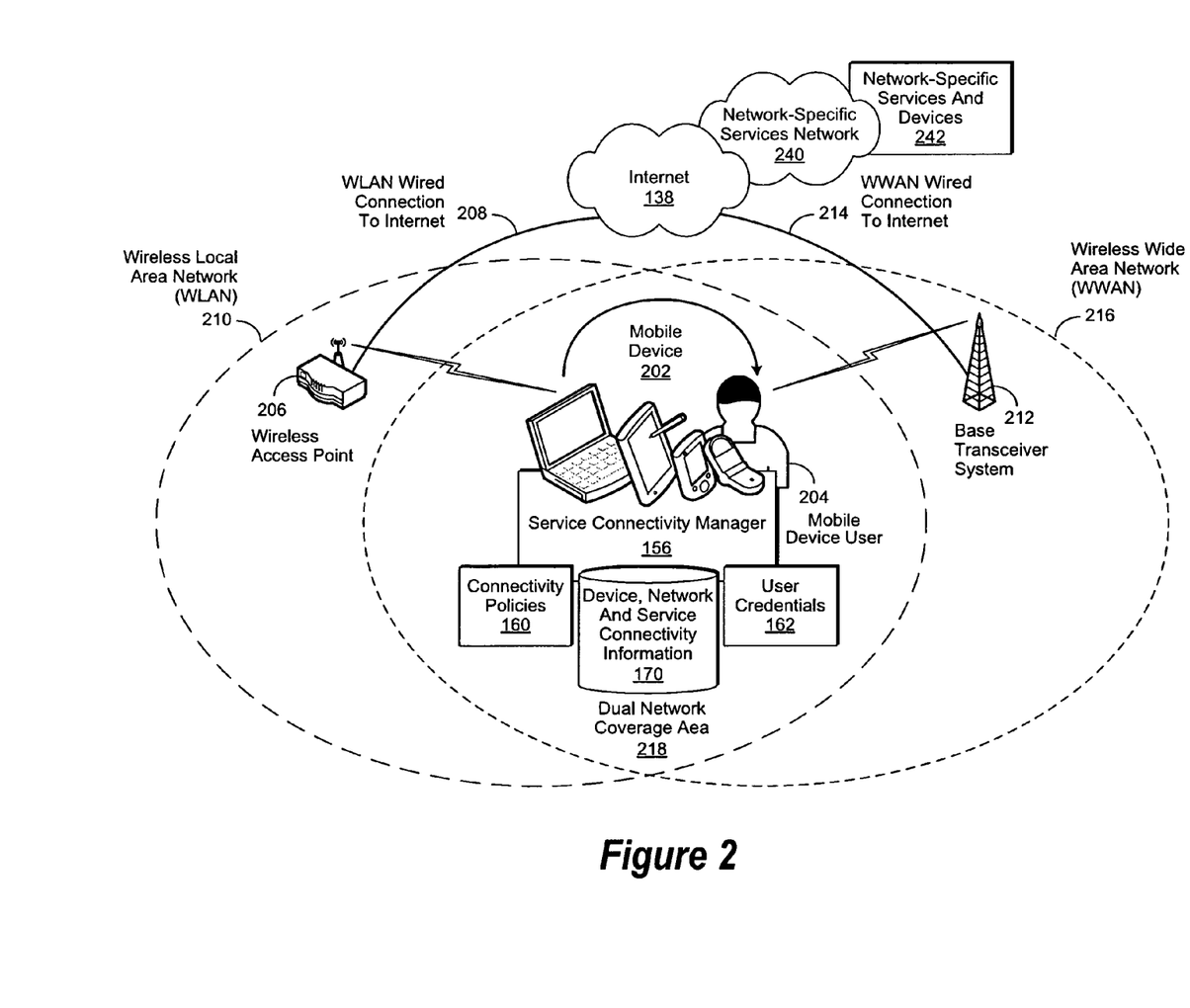
FIG. 2 is a simplified block diagram of an embodiment of the invention as implemented to manage the connectivity of a mobile device to a plurality of network-specific services.

FIG. 2 is a simplified block diagram of an embodiment of the invention as implemented to manage the connectivity of a mobile device 202 to a plurality of network-specific services and devices 242. In different embodiments, network-specific services and devices 242 include, but are not limited to, pay-per-view television content, premium digital content, printer services, and location-based services. In other embodiments, network-specific services and devices 242 include virtual private networks (VPNs), secured storage area networks (SANs), and specialized devices with predetermined quality of service (QoS) requirements.

In one embodiment, wireless wide area network (WWAN) 216 comprises a plurality of inter-coupled base transceiver systems 212, one or more of which is coupled to the Internet 138 by a wired connection 214. Wireless local area network (WLAN) 210 similarly comprises one or more wireless access points 206, one or more of which is likewise connected via wired connection 208 to the Internet 138. Wireless device 202 comprises a service connectivity manager 156, further comprising connectivity policies 160, device, network, and service connectivity information 170, and user credentials 162. Mobile device 202 also comprises a plurality of wireless modems (not shown), each of which is operable to provide connectivity with a predetermined type of wireless network (e.g., IEEE 802.11 WLAN, EDGE WWAN, etc). As each wireless modem senses the availability of the network protocol it supports, it is operable to establish and maintain an optimal network connection until connectivity is no longer available.

Service connectivity manager 156 monitors the operational status of each wireless modem to determine which type of network connectivity is available. Using predetermined criteria and operational parameters, the service connectivity manager 156 can control the wireless modems to establish an optimal connection, and then maintain that connection while connectivity is available. For example, a mobile device user 204 is in their office and the service connectivity manager determines that the WLAN modem detects the presence of office WLAN 210. The service connectivity manager 156 manages the operation of the WLAN modem to establish initial connectivity with the office WLAN 210, which requires user authentication as a security measure. The service connectivity manager 156 retrieves the appropriate user credentials 162, which are then submitted to the office WLAN 210. Once the user credentials 162 are submitted and accepted by WLAN 210, the service connectivity manager 156 establishes and maintains a compliant and optimal network connection.

Once connected, the mobile user 202 accesses network-specific services and devices 242 through the WLAN 210, which is connected to the Internet 138, which is in turn connected to a network-specific services network 240. The mobile device user 204 then decides to leave their office to go to a field site. The service connectivity manager 156 continues to maintain its connectivity with the mobile device user's office WLAN 210 as the mobile device user 204 is in transit to the field site. While in transit, the WWAN modem detects the presence of WWAN 216 while the mobile device user 204 continues to be within the coverage limits of the office WLAN 210.

Once sensed, the WWAN modem notifies the service connectivity manager 156 that WWAN connectivity has become available in the dual network coverage area 218. The service connectivity manager 156 references its device, network and service connectivity information 170, connectivity policies 160 and user credentials 162 and confirms that the mobile device 202 is able to connect to the WWAN 216 and that mobile device user 204 is authorized for connectivity. The service connectivity manager 156 continues to monitor the connectivity status of the mobile device 202 to WLAN 210. As the mobile device user leaves dual network coverage area 218, connectivity to WLAN 210 is no longer optimal. As a result, the service connectivity manager 156 manages the WWAN modem to similarly establish and maintain an optimal connection to the WWAN 216. In the process of transitioning connectivity to WWAN 216, service connectivity to network-specific services and devices 242 is maintained by service connectivity manager 156. In one embodiment, the service connectivity manager 156 automatically and transparently transfers connectivity from WLAN 210 to WWAN 216. In another embodiment, the service connectivity manager 156 notifies the mobile device user 204 of loss of connectivity to WLAN 210 and the availability of connectivity to WWAN 216. Once notified, the mobile device user is responsible to manually connect to WWAN 216.

Figure 3:
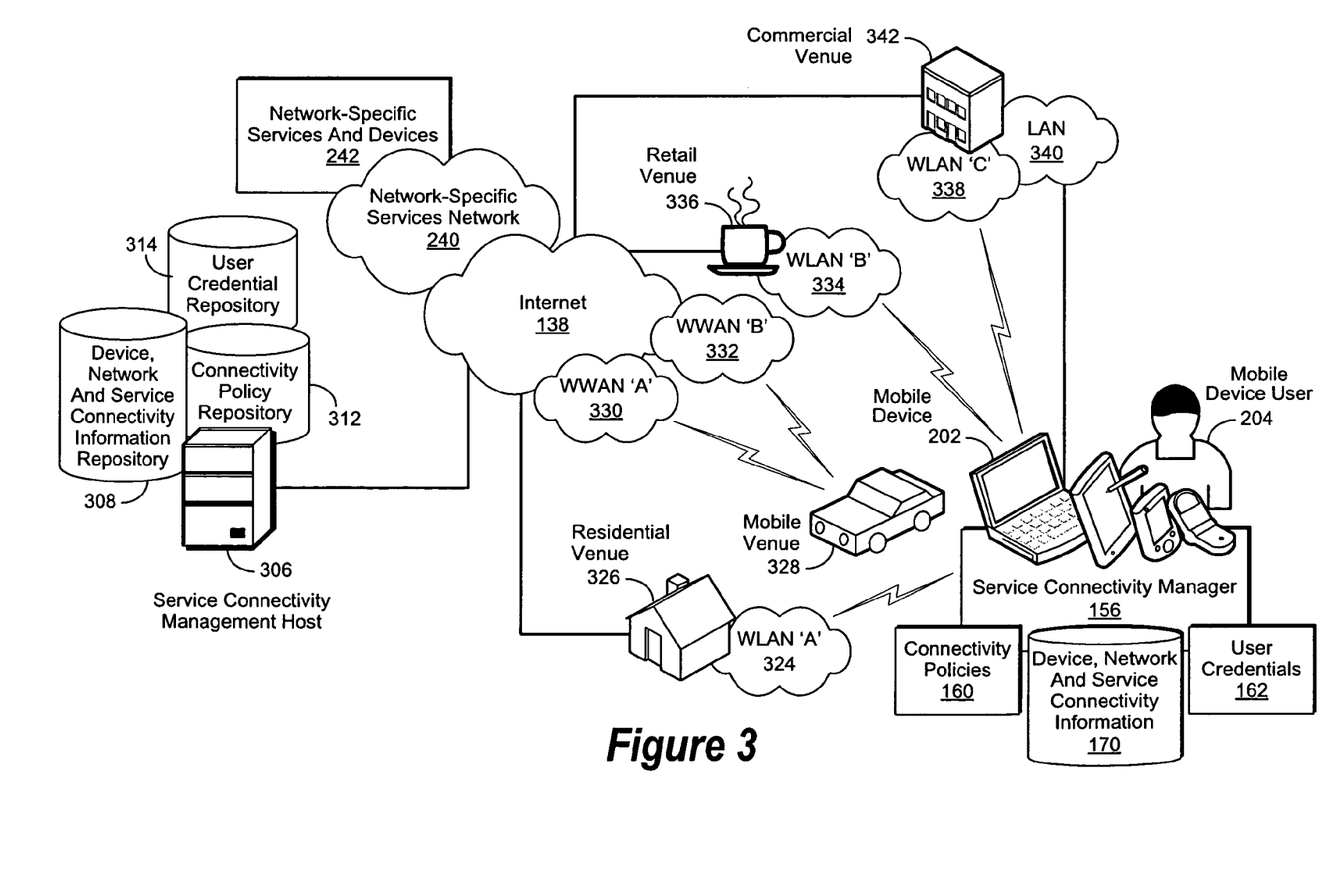
FIG. 3 is a simplified block diagram of a service connectivity manager as implemented in accordance with an embodiment of the invention.
Figure 4A:
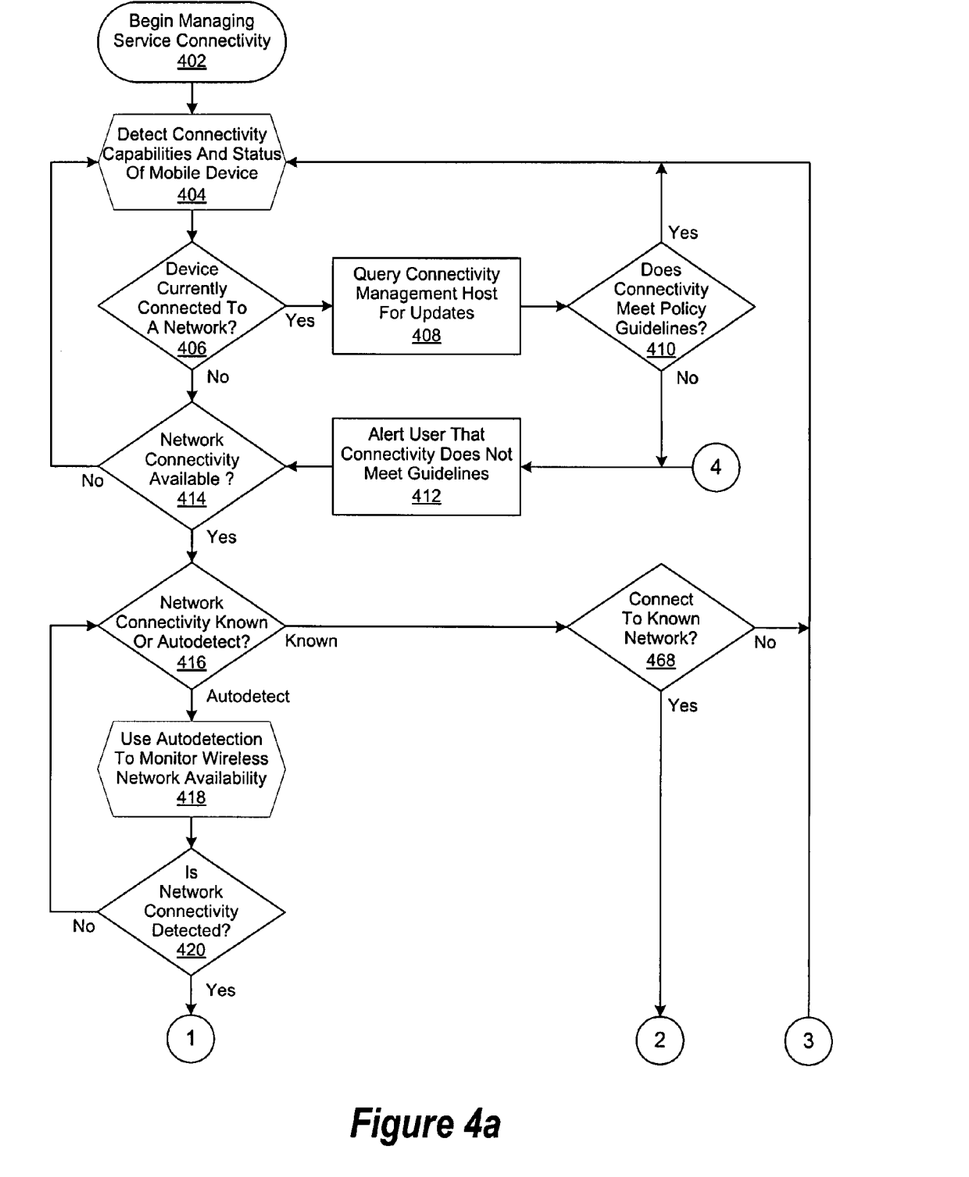
FIGS. 4*a*-*d* are a generalized flow chart illustrating a service connectivity manager as implemented in accordance with an embodiment of the invention.
Figure 4B:
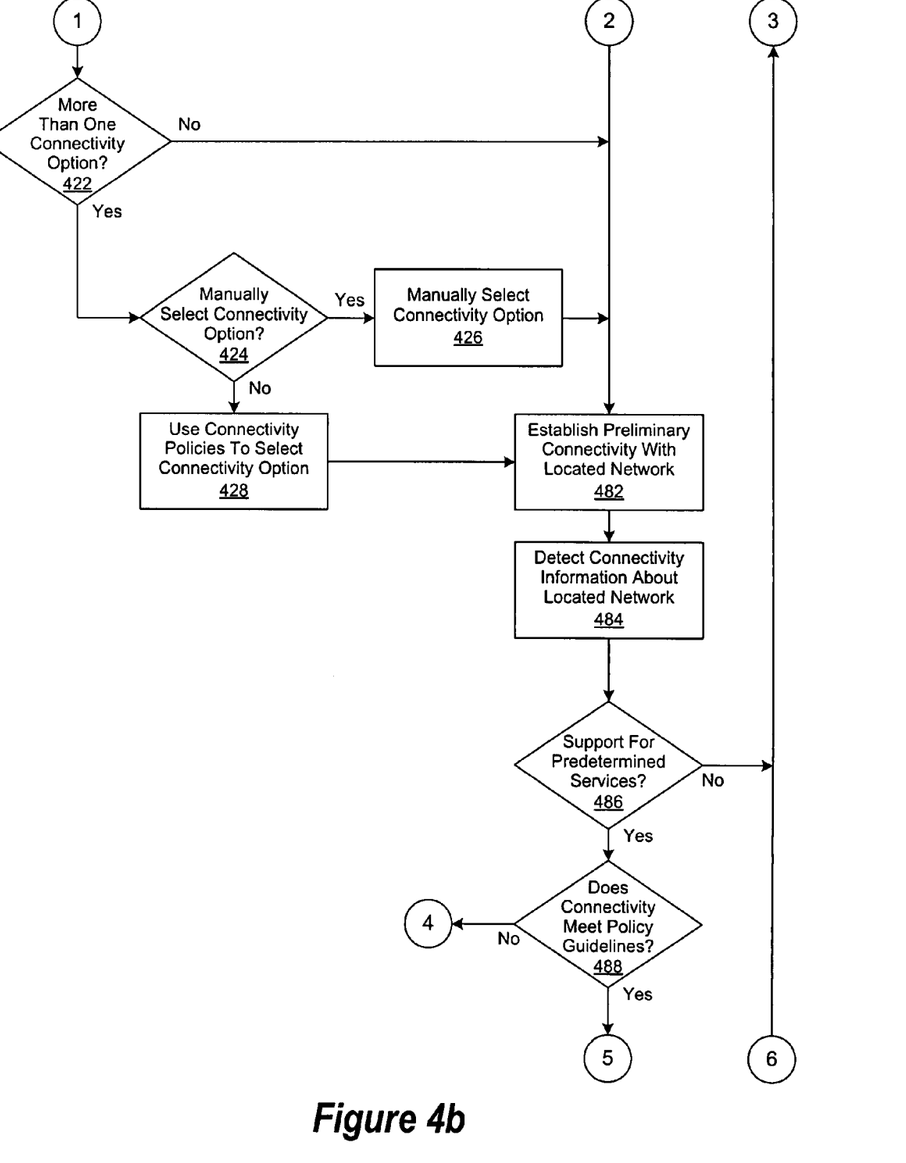
Figure 4C:
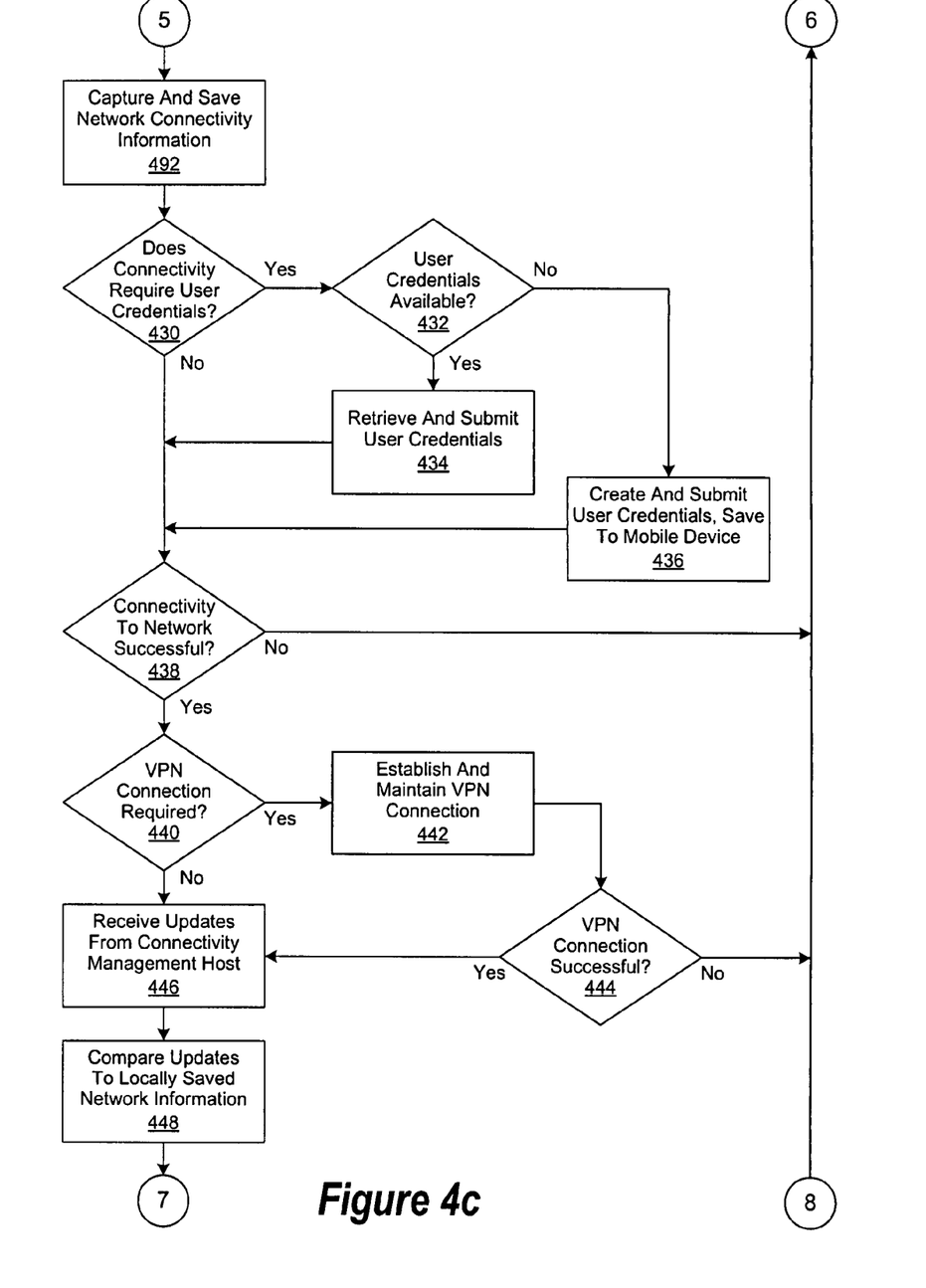
Figure 4D:
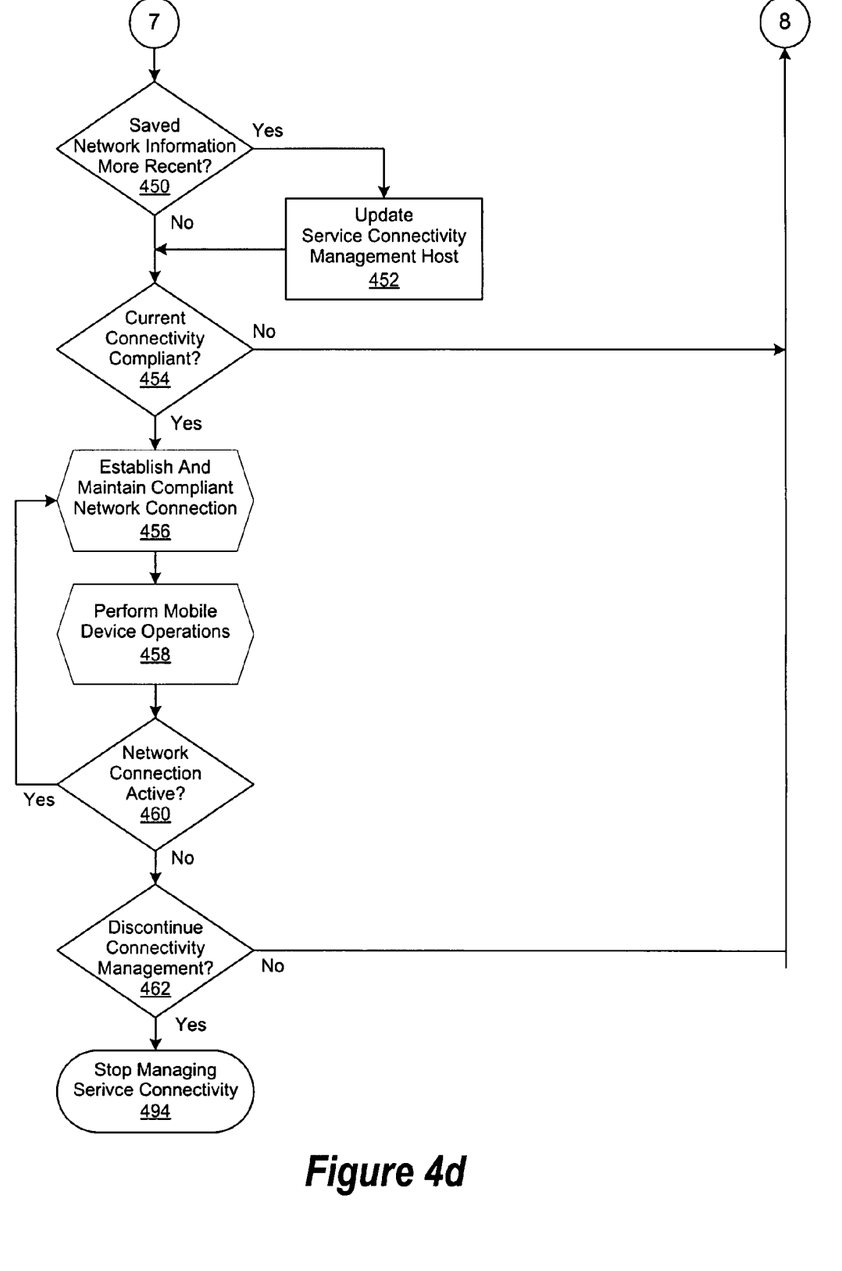

FIG. 3 is a simplified block diagram of a service connectivity manager 156 as implemented in accordance with an embodiment of the invention. In various embodiments, wireless device 202 comprises a service connectivity manager 156, further comprising connectivity policies 160, mobile device configuration, network connectivity, service connectivity information 170, and user credentials 162. Mobile device 202 also comprises a plurality of wireless modems (not shown), each of which is operable to provide connectivity with a predetermined type of wireless network (e.g., IEEE 802.11 WLAN, EDGE WWAN, etc). As each wireless modem senses the availability of the network protocol it supports, it is operable to establish and maintain an optimal network connection until connectivity is no longer available.

In one embodiment, mobile device user 204 operates mobile device 202 within a plurality of usage venues including residential venue 326, mobile venue 328, retail venue 336, and commercial venue 342. As the mobile device user 204 transits from one usage venue to another, the service connectivity manager 156 monitors the operational status of each wireless modem to determine which type of network connectivity is available and the connectivity services it supports. Using predetermined criteria and operational parameters, the service connectivity manager 156 can control the wireless modems to establish an optimal connection for a predetermined network-specific services and devices 242. Once established, the service connectivity manager 156 maintains the network connection while optimal connectivity is available. As an example, mobile device user 204 uses mobile device 202 to connect to network-specific services and devices 242 by establishing network connectivity through wireless local area network (WLAN) 'A' 324, which provides network connectivity for residential usage venue 326. The (WLAN) 'A' 324 provides access to the Internet 138, which in turn provides access to the network-specific services network 240, which provides access to network-specific services and devices 242 such as a storage area network (SAN). Accessing the SAN requires maintaining a predetermined network Quality of Service (QoS) over a virtual private network (VPN) connection. In this embodiment, the service connectivity manager 156 references device, network, and service connectivity information 170 and connectivity policies 160. IT then determines that the (WLAN) 'A' 324 is capable of supporting the QoS required for the VPN connection to the SAN. The service connectivity manager 156 then uses user credentials 162 to establish the VPN connection to the network-specific services and devices 242 comprising the VPN and SAN.

The mobile device user 204 then leaves residential usage venue 326 and travels by automobile, which serves as a mobile usage venue 328. As the mobile device user 204 leaves residential usage venue 326, connectivity with WLAN 'A' 324 is lost. While in transit, a WWAN modem implemented within mobile device 202 detects the presence of wireless wide area network (WWAN) 'A' 330. In different embodiments, WWAN 'A' 330 is based on an industry standard including two and a half generation (2.5G) wireless technologies such as general packet radio service (GPRS) and enhanced data rates for GSM evolution (EDGE). In still other embodiments, WWAN 266 is based on existing third generation (3G) wireless technologies including universal mobile telecommunications system (UMTS) and wideband code division multiple access (W-CDMA). In yet other embodiments, WWAN 266 is based on the implementation of other 3G technologies, including evolution-data optimized (EVDO), IEEE 802.16 (WiMAX), wireless broadband (WiBro), high-speed downlink packet access (HSDPA), high-speed uplink packet access (HSUPA), and emerging fourth generation (4G) wireless technologies.

Once sensed, the WWAN modem notifies the service connectivity manager 156 that WWAN connectivity has become available through WWAN 'A' 330. The service connectivity manager 156 then determines that the mobile device user's 204 connection to the network-specific services and devices 242 comprising the SAN can be sustained. Then the service connectivity manager 156 references its device, network and service connectivity information 170, connectivity policies 160 and user credentials 162 to determine the connectivity eligibility of WWAN 'A' 330. After performing predetermined comparison operations, the service connectivity manager 156 determines that while the mobile device 202 is able to connect to the WWAN 330, the mobile device user 204 is not authorized for connectivity. As a result, the service connectivity manager 156 continues to monitor the operational status of the WWAN modem implemented within mobile device 202.

As the mobile device user 204 continues in transit, the WWAN modem detects the presence of wireless wide area network (WWAN) 'B' 332. Once sensed, the WWAN modem notifies the service connectivity manager 156 that WWAN connectivity has become available through WWAN 'B' 332. In response, the service connectivity manager 156 references its device, network, and service connectivity information 170, connectivity policies 160 and user credentials 162 to determine the connectivity eligibility of WWAN 'B' 332. After performing predetermined comparison operations, the service connectivity manager 156 confirms that the mobile device 202 is able to connect to the WWAN 'B' 332. The service connectivity manager 156 then authorizes the mobile device user 204 to reestablish connectivity to the network-specific services and devices 242 comprising the SAN.

As a result, the service connectivity manager 156 manages the operation of the WWAN modem to establish initial connectivity with WWAN 'B' 332, which requires user authentication as a security measure. The service connectivity manager 156 retrieves the appropriate user credentials 162, which are then submitted to WWAN B' 332. Once the user credentials 162 are submitted and accepted by WWAN 'B' 332, the service connectivity manager 156 establishes and maintains a compliant and optimal network connection for connectivity to the Internet 138. In one embodiment, the service connectivity manager 156 automatically and transparently establishes connectivity with WWAN 'B' 332. In another embodiment, the service connectivity manager 156 notifies the mobile device user 204 of the availability of connectivity to WWAN 'B' 332. Once notified, the mobile device user is responsible to manually connect to WWAN 'B' 332.

While continuing in transit, the mobile device user 204 leaves the network coverage area of WWAN 'B' 332, connectivity is no longer optimal, and the mobile device user's 204 connection to the Internet 138 is dropped. Concurrently, the WLAN modem implemented within the mobile device 202 detects the presence of WLAN 'B' 334 located at retail usage venue 336. Once sensed, the WLAN modem notifies the service connectivity manager 156 that WLAN connectivity has become available through WLAN 'B' 334. In response, the service connectivity manager 156 references its device, network, and service connectivity information 170, connectivity policies 160 and user credentials 162 to determine the connectivity eligibility of WLAN 'B' 334. After performing predetermined comparison operations, the service connectivity manager 156 confirms that the mobile device 202 is able to connect to the WLAN 'B' 334. As a result, the service connectivity manager 156 authorizes the mobile device user 204 for connectivity to the network-specific services and devices 242 comprising the SAN. In one embodiment, the service connectivity manager 156 performs further comparison operations and determines that WWAN 330 provides high enough bandwidth and quality of service (QoS) for the VPN connection. In another embodiment, the service connectivity manager 156 automatically and transparently transfers connectivity from WWAN 'B' 332 to WLAN 'B' 334. In yet another embodiment, the service connectivity manager 156 notifies the mobile device user 204 of the loss of connectivity to WWAN 'B' 332 and the availability of connectivity to WLAN 'B' 334. Once notified, the mobile device user is responsible to manually connect to WLAN 'B' 334.

Upon leaving retail usage venue 336, the mobile device user exceeds the network coverage area of WLAN 'B' 334 and WLAN connectivity is lost. The wireless modems implemented within the mobile device 202 continue network auto-detection operations but fail to sense the presence of a wireless network before the mobile device user arrives at commercial usage venue 342. The mobile device user 204 is aware of the availability of WLAN 'C' 338, whose wireless network detection beacon is disabled, and the location of LAN 340 at commercial usage venue 342. After locating a connection port, a preliminary network connection is established to the LAN 340 by the service connectivity manager 156. Once the preliminary network connection is established, the service connectivity manager 156 detects and collects network connectivity information about the LAN 340. The network connectivity information is then filtered by the service connectivity manager 156 to eliminate network connectivity options and connectivity services that the mobile device 202 cannot support. Once the network connectivity information has been filtered, the service connectivity manager 156 establishes a preliminary connection to WLAN 'C' 338. Once the preliminary network connection is established, the service connectivity manager 156 detects and collects network connectivity information about the WLAN 'C' 338. The network connectivity information is then filtered by the service connectivity manager 156 to eliminate network connectivity options and connectivity services that the mobile device 202 cannot support. In one embodiment, the service connectivity manager 156 then applies a connectivity services discovery algorithm against device, network, and service connectivity information 170, connectivity policies 160, and user credentials 162 to determine which connectivity services WLAN 'C' 338 and LAN 340 can support. In another embodiment, the service connectivity manager 156 performs connectivity services queries against WLAN 'C' 338 and LAN 340 to determine which connectivity services they can support. In yet another embodiment, the service connectivity manager 156 performs connectivity services tests against WLAN 'C' 338 and LAN 340 to determine which connectivity services they can support.

Comparison operations are then performed on the collected service connectivity information to determine whether connectivity to the WLAN 'C' 338 and LAN 340 will comply with predetermined connectivity policies. If it is determined that connectivity to either WLAN 'C' 338 or LAN 340 does not comply with predetermined connectivity policies, then the service connectivity manager 156 discontinues respective connectivity efforts. Otherwise, service connectivity information associated with the WLAN 'C' 338 and LAN 340 is captured by the service connectivity manager 156 and saved in mobile device 202. In one embodiment, predetermined service connectivity information is automatically collected from the WLAN 'C' 338 and LAN 340 and saved by the service connectivity manager 156. In another embodiment, the predetermined service connectivity information is manually entered by the mobile device user 204 into the service connectivity manager 156. In yet another embodiment, the service connectivity manager 156 saves the collected service connectivity information external to the mobile device 202, such as through a USB or Bluetooth connection to another device.

Once service connectivity information has been collected and saved, the service connectivity manager 156 determines whether connectivity to WLAN 'C' 338 and LAN 340 requires the provision of user credentials. If user credentials are required, then the service connectivity manager 156 determines whether the required user credentials are available. If user credentials are available, then they are retrieved by the service connectivity manager 156 and respectively submitted to the WLAN 'C' 338 and LAN 340. For example, in once embodiment a user ID and password is securely stored in the mobile device 202. In another embodiment, user credentials are securely stored in a subscriber information module (SIM) which is contained within the mobile device 202. In yet another embodiment, the mobile device 202 initiates a separate network connection, such as through a Bluetooth connection, to retrieve user credentials from another device or from a network host. Many such embodiments are possible and the examples given herein are not exhaustive. If it is determined by the service connectivity manager 156 that user credentials are not available, then they are created by the mobile device user 204 and submitted respectively to the WLAN 'C' 338 and LAN 340. After the user credentials are accepted by the WLAN 'C' 338 and LAN 340, the service connectivity manager 156 then saves them on the mobile device 202 for later reuse.

Once the user credentials are submitted and network connectivity has been successfully achieved, the service connectivity manager 156 determines whether a virtual private network (VPN) connection is required. If a VPN connection is required, then the service connectivity manager 156 uses connectivity policies 160, user credentials 162, and device, network and service connectivity information 170 to perform VPN operations known to those of skill in the art. Once the VPN connection is established, then service connectivity information updates are received by the service connectivity manager 156 from the service connectivity management host 306 via Internet 138. In various embodiments, service connectivity management host 306 comprises device, network and service connectivity information repository 308, connectivity policy repository 312, and user credential repository 314.

Once received, these service connectivity information updates are compared by service connectivity manager 156 to the device, network, and service connectivity information 170, connectivity policies 160, and user credentials 162 information captured and stored on the mobile device since the last network host update. If it is determined that the captured and stored service connectivity information is more recent than the network host updates, then the service connectivity management host 306 is updated by the service connectivity manager 156. After it is determined that the most current service connectivity information is available, the service connectivity manager 156 then confirms that the network connections to the WLAN 'C' 338 and LAN 340 are compliant. If they are not, the service connectivity manager 156 discontinues respective service connectivity efforts with WLAN 'C' 338 and LAN 340. Otherwise a compliant network connection is established and mobile device 202 operations are performed.

In one embodiment, the service connectivity manager 156 monitors service connectivity applications that are executed by mobile device 202 or mobile device user 204, to determine the connectivity service required. In another embodiment, comparison operations are performed to determine the optimal match between a plurality of service connectivity options (e.g., WLAN 'C' 338 and LAN 340) and corresponding service connectivity applications. Once the optimal match is determined, the service connectivity manager 156 makes the connection between the mobile device 202 and the appropriate network. In yet another embodiment, the connectivity services provided by the plurality of service connectivity options are hierarchically prioritized by the service connectivity manager 156. In a different embodiment, the service connectivity manager 156 presents the plurality of service connectivity options to the mobile device user 204 for hierarchical prioritization. In one embodiment, the service connectivity manager 156 prompts the mobile device user 204 to execute a predetermined connectivity connectivity service application (e.g., instant messenger client, streaming video client, etc.) when its corresponding connectivity service is available. In another embodiment, these prompts are performed automatically by the service connectivity manager 156. In yet another embodiment, these prompts are performed according to preset defaults or learned behavior of the mobile device user 204.

FIGS. 4a-d are a generalized flow chart illustrating a service connectivity manager as implemented in accordance with an embodiment of the invention. In this embodiment, management of a mobile device's connectivity to a plurality of networks comprising a plurality of connectivity services begins in step 402. In step 404, detection and monitoring operations are performed by the service connectivity manager to determine the network connectivity capabilities of a mobile device and the connectivity services it is capable of supporting. In one embodiment, a database of mobile device configuration, network connectivity, and service connectivity information is queried by the service connectivity manager prior to performing monitoring operations. As an example, the database query may indicate that the mobile device is configured with a physical Ethernet port, a WLAN modem, a general purpose Web browser, an email client, and a specialized, high-speed streaming media viewer. The database query may also indicate that the mobile device comprises network connectivity, account, and user ID information to physically connect to a residential digital subscriber line (DSL) broadband network. In addition, the query may indicate the presence of additional information that allows the mobile device establish a virtual private network (VPN) connection to a corporate Ethernet LAN. The database query may likewise indicate similar wireless connectivity information for three WLAN networks, two of which are medium speed and one of which is low speed.

In another embodiment, the service connectivity manager is also capable of detecting which connectivity service applications are running and inferring which connectivity services are desired. For example, if the service connectivity manager detects that a Web browser is running, then it infers that Internet access is desired and it determines that connectivity to any available network is sufficient. However, if the specialized, high-speed streaming media viewer is running, then the connectivity manager infers that Internet access is desired but only high bandwidth connectivity, such as from the residential DSL or the corporate LAN network, will be sufficient. As a result, the service connectivity manager will not attempt to connect to one of the lower speed WLAN networks, even if connectivity is available.

As another example, the mobile device comprises a universal serial bus (USB) port, an embedded Bluetooth transceiver, and a print queue. The service connectivity manager monitors the status of the print queue to determine if printer services are required. If they are, then the service connectivity manager checks the USB port to determine whether it is connected to a printer and likewise checks the Bluetooth transceiver to determine whether a PAN connection to a printer can be established. If the service connectivity manager determines that the USB port is not connected to a printer, yet a printer is accessible through a Bluetooth PAN, then connectivity is established with the printer using the mobile device's Bluetooth transceiver. Similarly, if an IEEE 802.11 WiFi adapter is attached to the USB port of the mobile device, then the service connectivity manager detects its presence, and if it is activated, begins detection operations to discover the presence of WiFi network accessibility. If discovered, and if a printer is attached to the WiFi network and is accessible, then the service connectivity manager connects the mobile device to the printer through a WiFi connection.

If it is determined in step 406 that the mobile device is not currently connected to a network, then it is determined in step 414 whether available network connectivity is available. If it is determined in step 414 that network connectivity is not available, then the process continues, beginning with step 404. However, if it is determined in step 406 that the mobile device is currently connected to a network, then the service connectivity manager queries a network-based service connectivity management host for service connectivity information updates. In various embodiments, the service connectivity information repository further comprises a plurality of predetermined mobile device, network, and service connectivity information. Similarly, the service connectivity information repository comprises predetermined service connectivity policies and predetermined mobile device user credentials.

Once service connectivity information updates, including service connectivity policies, are received by the service connectivity manager in step 408, then it is determined in step 410 whether the current service connectivity complies with the most current service connectivity policies. If current service connectivity complies with the most current service connectivity policies, then the process continues, beginning with step 404. If it is determined in step 410 that the current service connectivity does not comply with the most current service connectivity policies, then the mobile device user is alerted in step 412 that service connectivity compliance is not being met. In one embodiment, service connectivity that fails to comply with the current service connectivity policy is automatically discontinued and the network connection is dropped. In another embodiment, the mobile device user is given the option to continue non-compliant service connectivity, or to locate alternative service connectivity that complies with the current service connectivity policy. In yet another example, the service connectivity manager automatically and transparently transfers network connectivity to another network that complies with the current service connectivity policy. As an example, a mobile device may comprise a WLAN modem for WiFi connectivity as well as a WWAN modem for EDGE connectivity. If both WiFi and EDGE connectivity are accessible, a corporate service connectivity policy may state that WiFi connectivity be given precedence due to its higher bandwidth and lower cost.

If it is determined in step 414 that network connectivity is available, then it is determined in step 416 whether known network connectivity is available or whether wireless network autodetection operations will be performed by the service connectivity manager. If it is determined in step 416 to autodetect the presence of a wireless network, then the service connectivity manager performs wireless network autodetection operations in step 418. If it is determined in step 420 that the presence of a wireless network is not detected, then the process continues, beginning with step 416.

Otherwise, it is determined in step 422 whether more than one wireless network connectivity option is detected. If there is, then it is determined in step 424 whether to manually select the wireless network connectivity option. If it is determined in step 424 to not manually select the wireless network connectivity option, then predetermined connectivity policies are used in step 428 to automatically select wireless network connectivity that comply with the policies. Once a wireless network connectivity option is selected, a preliminary network connection is established with the located network by the service connectivity manager in step 482.

However, there are times when the presence of a wireless network is known yet it cannot be automatically detected, such as when its broadcast beacon has been disabled. In other cases, connectivity to a known physical network may be available. If this is the case, then a determination is made in step 416 that the availability of network connectivity is known. It is then determined in step 468 whether the service connectivity manager will connect to the known network. If it is decided in step 468 to not connect to the known network, then the process is repeated, beginning with step 404. Otherwise, a preliminary network connection is established with the located network by the service connectivity manager in step 482.

Regardless of whether the availability of network connectivity was known or autodetected, the service connectivity manager detects and collects service connectivity information about the located network in step 484 once the preliminary network connection is established. Comparison operations are then performed on the collected service connectivity information in step 486 to determine whether connectivity to the located network will support predetermined connectivity services. If it is determined in step 486 that predetermined connectivity services are not supported, then the process is repeated, beginning with step 404. Otherwise it is determined in step 488 whether connectivity to the located network will comply with predetermined service connectivity policies. If it is determined in step 488 that connectivity to the located network does not comply with predetermined service connectivity policies, then the process is repeated, beginning with 412.

Otherwise, predetermined service connectivity information is captured and saved in step 492. In one embodiment, predetermined service connectivity information is automatically collected from the located network and saved by the service connectivity manager. In another embodiment, the predetermined service connectivity information is manually entered by the mobile device user into the service connectivity manager. In yet another embodiment, the collected service connectivity information is saved by the service connectivity manager within the mobile device for later reuse. In still another embodiment, the service connectivity manager saves the collected service connectivity information external to the mobile device, such as through a USB or Bluetooth connection to another device.

Once service connectivity information has been collected and saved, it is then determined in step 430 whether service connectivity requires the provision of user credentials. If user credentials are required, then it is determined in step 432 if the required user credentials are available. If user credentials are available, then they are retrieved and submitted in step 434. For example, in one embodiment a user ID and password is securely stored in the mobile device. In another embodiment, user credentials are securely stored in a subscriber information module (SIM) which is contained within the mobile device. In yet another embodiment, the mobile device may initiate a separate network connection, such as through a Bluetooth connection, to retrieve user credentials from another device or from a network host. Many such embodiments are possible and the examples given herein are not exhaustive. If it is determined in step 432 that user credentials are not available, then they are created and submitted in step 436 and then saved on the mobile device for later reuse. Once the user credentials are submitted, the process continues beginning with step 438, where it is determined whether service connectivity has been successfully achieved. If it has not, then the process continues, beginning with step 404.

Otherwise, it is then determined in step 440 whether a virtual private network (VPN) connection is required. If it is, then operations known to those of skill in the art are performed to establish and maintain a VPN connection in step 442. If it is determined in step 444 that the operations to establish and maintain a VPN were unsuccessful, then the process is repeated, beginning with step 404. Otherwise, once the VPN connection is successfully established in step 442, or if it is determined in step 440 that no VPN connection is required, then service connectivity information updates are received from the service connectivity management host in step 446.

Once service connectivity information updates are received in step 446 they are compared in step 448 to service connectivity information captured and stored on the mobile device since the last network host update. If it is determined in step 450 that the captured and stored service connectivity information is more recent than the network host updates, then the service connectivity management host is updated by the mobile device's service connectivity manager in step 452.

After it has been determined in steps 446, 448 and 450 that the most current service connectivity information is available, the service connectivity manager determines in step 454 whether the current network connection is compliant. If it is not, the process is repeated, beginning with step 404. Otherwise a compliant network connection is established and maintained in step 456 and mobile device operations are performed in step 458. If it is determined in step 460 that the network connection is active, then the process is repeated, beginning with step 456. Otherwise, it is determined in step 462 whether to discontinue service connectivity management. If it is not, then the process repeats itself beginning with step 404. Otherwise, service connectivity management is discontinued in step 494.

Skilled practitioners in the art will recognize that many other embodiments and variations of the present invention are possible. In addition, each of the referenced components in this embodiment of the invention may be comprised of a plurality of components, each interacting with the other in a distributed environment. Furthermore, other embodiments of the invention may expand on the referenced embodiment to extend the scale and reach of the system's implementation.

What is claimed is:

1. A system for managing the connectivity of a mobile device to a plurality of connectivity services, comprising:
    a repository of service connectivity management information, stored on a network host, wherein said service connectivity management information comprises:
        a plurality of predetermined connectivity services information;
        a plurality of predetermined network connectivity information;
        a plurality of predetermined connectivity policies;
        a plurality of predetermined mobile device user credentials; and
    a service connectivity manager operable to use said service connectivity management information to:
        determine the connectivity services supported by at least one mobile device and provided by a first network; and
        manage the connectivity of said connectivity services between said at least one mobile device and said first network.

2. The system of claim 1, wherein said at least one mobile device is physically connected to a plurality of networks comprising said plurality of connectivity services.

3. The system of claim 1, wherein said at least one mobile device is wirelessly connected to a plurality of networks comprising said plurality of connectivity services.

4. The system of claim 1, wherein said at least one mobile device is physically and wirelessly connected to a plurality of networks comprising said plurality of connectivity services.

5. The system of claim 1, wherein said network host is operable to receive service connectivity management information from a plurality of sources.

6. The system of claim 5, wherein said network host receives said service connectivity management information from said service connectivity manager, wherein said service connectivity management information is automatically collected by said service connectivity manager.

7. The system of claim 5, wherein said network host receives said service connectivity management information from said service connectivity manager, wherein said service connectivity management information is manually entered into said service connectivity manager by a user of said at least one mobile device.

8. The system of claim 1, wherein said network host is operable to provide at least one predetermined subset of said service connectivity management information to said at least one mobile device.

9. The system of claim 1, wherein said predetermined service connectivity management information comprises connectivity services information operable to be used by said service connectivity manager for said managing the connectivity service connectivity of said at least one mobile device to said first network.

10. The system of claim 9, wherein said connectivity is managed by said service connectivity manager monitoring at least one connectivity service application running on said at least one mobile device to determine whether said first network provides the connectivity service required for its support.

11. The system of claim 9, wherein said connectivity is managed by said service connectivity manager monitoring said first network to detect support of a predetermined connectivity service, and wherein said mobile device is prompted to run a corresponding connectivity service application if it is detected.

12. The system of claim 9, wherein said connectivity is managed by said service connectivity manager providing a plurality of service connectivity options comprising support for said connectivity service.

13. The system of claim 1, wherein said predetermined service connectivity information comprises network protocol information.

14. The system of claim 1, wherein said predetermined connectivity policies comprise network security parameters.

15. The system of claim 13, wherein said network security parameters comprise virtual private network (VPN) information, wherein said VPN information is used by said service connectivity manager to generate a VPN network connection.

16. The system of claim 1, wherein said predetermined connectivity policies comprise quality of service (QOS) parameters.

17. The system of claim 1, wherein said predetermined connectivity policies comprise network connectivity cost parameters.

18. The system of claim 1, wherein said predetermined mobile device user credentials comprise mobile device user authentication information.

19. The system of claim 17, wherein said mobile device user authentication information is cryptographically secured.

20. The system of claim 1, wherein said service connectivity manager is operable to determine the presence of a wireless network by detecting a wireless network signal.

21. The system of claim 1, wherein said service connectivity manager is operable to use said service connectivity management information to autonomously transfer said connectivity of said at least one mobile device from said first network to a second network.

22. A method for managing the connectivity of a mobile device to a plurality of connectivity services, comprising:
   accessing a repository of service connectivity management information, stored on a network host, wherein said service connectivity management information comprises:
      a plurality of predetermined connectivity services information;
      a plurality of predetermined network connectivity information;
      a plurality of predetermined service connectivity policies;
      a plurality of predetermined mobile device user credentials; and
   operating a service connectivity manager operable to use said network connectivity management information to:
      determine the connectivity services supported by at least one mobile device and provided by a first network; and
      manage the connectivity of said connectivity services between said at least one mobile device and said first network.

23. The method of claim 22, wherein said at least one mobile device is physically connected to a plurality of networks comprising said plurality of connectivity services.

24. The method of claim 22, wherein said at least one mobile device is wirelessly connected to a plurality of networks comprising said plurality of connectivity services.

25. The method of claim 22, wherein said at least one mobile device is physically and wirelessly connected to a plurality of networks comprising said plurality of connectivity services.

26. The method of claim 22, wherein said network host is operable to receive service connectivity management information from a plurality of sources.

27. The method of claim 26, wherein said network host receives said service connectivity management information from said service connectivity manager, wherein said service connectivity management information is automatically collected by said service connectivity manager.

28. The method of claim 26, wherein said network host receives said service connectivity management information from said service connectivity manager, wherein said service connectivity management information is manually entered into said service connectivity manager by a user of said at least one mobile device.

29. The method of claim 22, wherein said network host is operable to provide at least one predetermined subset of said service connectivity management information to said at least one mobile device.

30. The method of claim 22, wherein said predetermined service connectivity management information comprises connectivity services information operable to be used by said service connectivity manager for said managing the connectivity service connectivity of said at least one mobile device to said first network.

31. The method of claim 30, wherein said connectivity is managed by said service connectivity manager monitoring at least one connectivity service application running on said at least one mobile device to determine whether said first network provides the connectivity service required for its support.

32. The method of claim 30, wherein said connectivity is managed by said service connectivity manager monitoring said first network to detect support of a predetermined connectivity service, and wherein said mobile device is prompted to run a corresponding connectivity service application if it is detected.

33. The method of claim 30, wherein said connectivity is managed by said service connectivity manager providing a plurality of service connectivity options comprising support for said connectivity service.

34. The method of claim 22, wherein said predetermined service connectivity information comprises network protocol information.

35. The method of claim 22, wherein said predetermined connectivity policies comprise network security parameters.

36. The method of claim 34, wherein said network security parameters comprise virtual private network (VPN) information, wherein said VPN information is used by said service connectivity manager to generate a VPN network connection.

37. The method of claim 22, wherein said predetermined connectivity policies comprise quality of service (QOS) parameters.

38. The method of claim 22, wherein said predetermined connectivity policies comprise network connectivity cost parameters.

39. The method of claim 22, wherein said predetermined mobile device user credentials comprise mobile device user authentication information.

40. The method of claim 22, wherein said mobile device user authentication information is cryptographically secured.

41. The method of claim 22, wherein said service connectivity manager is operable to determine the presence of a wireless network by detecting a wireless network signal.

42. The method of claim 22, wherein said service connectivity manager is operable to use said service connectivity management information to autonomously transfer said connectivity of said at least one mobile device from said first network to a second network.

* * * * *